US008683022B2

(12) United States Patent
Nelson et al.

(10) Patent No.: US 8,683,022 B2
(45) Date of Patent: Mar. 25, 2014

(54) METHODS AND APPARATUS FOR ASSIGNING A PHYSICAL ADAPTER TO A VIRTUAL ADAPTER

(75) Inventors: Randall S. Nelson, Rochester, NY (US); Eric G. Thiemann, Hayfield, MN (US)

(73) Assignee: International Business Machines Corporation, Armonk, NY (US)

( * ) Notice: Subject to any disclaimer, the term of this patent is extended or adjusted under 35 U.S.C. 154(b) by 1840 days.

(21) Appl. No.: 11/670,633

(22) Filed: Feb. 2, 2007

(65) Prior Publication Data
US 2008/0189433 A1 Aug. 7, 2008

(51) Int. Cl.
*G06F 15/173* (2006.01)
(52) U.S. Cl.
USPC .............................. 709/222; 709/220; 709/227
(58) Field of Classification Search
USPC ........................................ 709/220, 222, 227
See application file for complete search history.

(56) References Cited

U.S. PATENT DOCUMENTS

| | | | | |
|---|---|---|---|---|
| 5,923,854 | A * | 7/1999 | Bell et al. ....................... | 709/243 |
| 6,567,377 | B1 * | 5/2003 | Vepa et al. ..................... | 370/230 |
| 6,590,861 | B1 * | 7/2003 | Vepa et al. ..................... | 370/216 |
| 6,658,018 | B1 * | 12/2003 | Tran et al. ...................... | 370/465 |
| 6,857,069 | B1 | 2/2005 | Rissmeyer et al. | |
| 6,965,930 | B1 * | 11/2005 | Arrowood et al. ............ | 709/223 |
| 7,231,462 | B2 * | 6/2007 | Berthaud et al. .............. | 709/249 |
| 7,484,029 | B2 * | 1/2009 | Boyd et al. ..................... | 710/310 |
| 7,493,370 | B2 * | 2/2009 | Bakke et al. ................... | 709/208 |
| 2004/0255047 | A1 * | 12/2004 | Larson et al. ................. | 709/249 |
| 2005/0013441 | A1 | 1/2005 | Klein | |
| 2005/0055700 | A1 * | 3/2005 | Singler et al. ................. | 719/311 |
| 2005/0066033 | A1 * | 3/2005 | Cheston et al. ............... | 709/225 |
| 2005/0216668 | A1 | 9/2005 | Kobayashi et al. | |
| 2006/0034190 | A1 * | 2/2006 | McGee et al. ................. | 370/254 |
| 2006/0047907 | A1 | 3/2006 | Shiga et al. | |
| 2006/0195617 | A1 * | 8/2006 | Arndt et al. ....................... | 710/1 |
| 2006/0218388 | A1 | 9/2006 | Zur et al. | |
| 2007/0226360 | A1 | 9/2007 | Gupta et al. | |
| 2008/0028052 | A1 | 1/2008 | Currid et al. | |

OTHER PUBLICATIONS

VMWARE; "SAN Configuration Guide-ESX Server 3.0 and VirtualCenter 2.0"; Jun. 15, 2006; http://www.vmware.com/search/.

* cited by examiner

*Primary Examiner* — Phuoc Nguyen
(74) *Attorney, Agent, or Firm* — Dugan & Dugan P.C.

(57) ABSTRACT

Apparatus and methods of assigning a physical adapter local to a computer to a virtual adapter in a computer through which the virtual adapter may receive and transmit data is provided. The apparatus and methods may include (1) providing a system including a plurality of computers coupled via a network, wherein a first computer of the plurality of computers includes a plurality of physical adapters and at least one virtual adapter; (2) for each virtual adapter in the first computer, assigning a rank to each physical adapter in the first computer; and (3) based on the ranks, testing one or more of the physical adapters in the first computer for connectivity to a physical adapter in a second computer with which a first virtual adapter is likely to communicate. Connectivity tests are started in a staggered manner that favors highly ranked physical adapters. Numerous other aspects are provided.

21 Claims, 5 Drawing Sheets

METHODS AND APPARATUS FOR ASSIGNING A PHYSICAL ADAPTER TO A VIRTUAL ADAPTER

FIELD OF THE INVENTION

The present invention relates generally to computer systems, and more particularly to methods and apparatus for assigning a physical adapter to a virtual adapter.

BACKGROUND

A system may include a plurality of computers coupled via a network. Each computer may include one or more physical network adapters each of which may be adapted to receive data from the network and transmit data to the network. Further, each computer may execute software that provides one or more virtual adapters. A virtual adapter is a software-based network adapter that actually uses a physical adapter to receive data from the network in the computer and to transmit data from the computer to the network. Before the virtual adapter of a computer may be brought on-line (e.g., into a connected state), the virtual adapter must be configured. More specifically, a physical adapter local to the computer including the virtual adapter should be selected from which the virtual adapter may transmit data from and receive data in the computer. Further, a physical adapter in a remote computer to be accessed over the network by the virtual adapter may be specified. For example, the remote physical adapter may be specified by a user.

However, selecting a physical adapter from a plurality of physical adapters local to a computer for a virtual adapter to use may be problematic. Many times the physical adapter selected for the virtual adapter to employ to transmit data from and receive data in the computer may not be the best choice. For example, according to a first method to select a local physical adapter for a virtual adapter, a computer may serially test a local plurality of physical adapters for physical connectivity to the selected remote physical adapter, and select the first local physical adapter that is determined to be physically connected to the selected remote physical adapter. However, this method may be time consuming (e.g., if the first one or two local physical adapters tested are not physically connected to the selected remote physical adapter, because typical implementation involves a protocol timeout).

According to a second method to select a local physical adapter for a virtual adapter, a computer may simultaneously test a plurality of local physical adapters for connectivity to the selected remote physical adapter, and select the first local physical adapter that passes the test. However, such a method may result in an unbalanced distribution of physical adapter usage by virtual adapters in the computer.

According to a third method to select a local physical adapter for a virtual adapter, a local physical adapter may be manually configured (e.g., selected by a user). However, this method may be time consuming because a user must configure a local physical adapter for each virtual adapter of the computer. Additionally, such method requires the user be knowledgeable about the configuration and topology of the system network. Additionally, the method may be prone to user errors (e.g., inadvertent typographical error during configuration and/or inadvertent selection by the user of a local physical adapter that is not connected to the remote physical adapter).

According to a fourth method, a local physical adapter for a virtual adapter may be randomly selected (e.g., by the computer). However, the randomly-selected local physical adapter may not be physically connected to the remote physical adapter. Additionally, the randomly-selected physical adapter may result in an unbalanced distribution of physical adapter usage by virtual adapters in the computer.

Thus, the above-described methods of selecting a local physical adapter for a virtual adapter all have disadvantages and may not result in selection of the most appropriate physical adapter for the virtual adapter. Accordingly, improved methods and apparatus for assigning a local physical adapter to a virtual adapter of a computer are desired.

SUMMARY OF THE INVENTION

In a first aspect of the invention, a first method is provided for assigning a physical adapter local to a computer to a virtual adapter in the computer through which the virtual adapter may receive and transmit data. The first method includes the steps of (1) providing a system including a plurality of computers coupled via a network, wherein a first computer of the plurality of computers includes a plurality of physical adapters and at least one virtual adapter; (2) for each virtual adapter in the first computer, assigning a rank to each physical adapter in the first computer; and (3) based on the ranks, testing one or more of the physical adapters in the first computer for connectivity to a physical adapter in a second computer with which a first virtual adapter is likely to communicate.

In a second aspect of the invention, a first apparatus is provided for assigning a physical adapter local to a computer to a virtual adapter in the computer through which the virtual adapter may receive and transmit data. The first apparatus includes (1) a first computer adapted to couple to a second computer via a network and including (a) a plurality of physical adapters; and (b) at least one virtual adapter. The first computer is adapted to (i) for each virtual adapter in the first computer, assign a rank to each physical adapter in the first computer; and (ii) based on the ranks, test one or more of the physical adapters in the first computer for connectivity to a physical adapter in the second computer with which the first virtual adapter is likely to communicate.

In a third aspect of the invention, a first system is provided for assigning a physical adapter local to a computer to a virtual adapter in the computer through which the virtual adapter may receive and transmit data. The first system includes (1) a first computer including (a) a plurality of physical adapters; and (b) at least one virtual adapter; (2) a second computer including a physical adapter with which a virtual adapter of the first computer is likely to communicate; and (3) a network coupling the first and second computers. The first computer is adapted to (i) for each virtual adapter in the first computer, assign a rank to each physical adapter in the first computer; and (ii) based on the ranks, test one or more of the physical adapters in the first computer for connectivity to the physical adapter in the second computer with which the first virtual adapter is likely to communicate. Numerous other aspects are provided in accordance with these and other aspects of the invention.

Other features and aspects of the present invention will become more fully apparent from the following detailed description, the appended claims and the accompanying drawings.

DETAILED DESCRIPTION

The present invention provides methods and apparatus for assigning one of a plurality of local physical adapters to a virtual adapter of a computer. For example, for each virtual adapter included in the computer, the computer may rank the plurality of local physical adapters. More specifically, the computer may assign respective ranks to the plurality of local physical adapters. A rank assigned to a local physical adapter may indicate whether the local physical adapter is available to be assigned to the virtual adapter. Further, each rank may be based on local properties (e.g., operational conditions and/or configuration) of the computer. The present invention may employ the rank to select a physical adapter to be assigned to the virtual adapter from the plurality of local physical adapters. More specifically, the computer may test the plurality of local physical adapters for connectivity to a remote physical adapter until at least one local physical adapter passes the test. Ranks assigned to the plurality of local physical adapters, respectively, determine the order in which the local physical adapters are tested for connectivity to the remote physical adapter. The above-described connectivity tests may overlap and be offset in time. Once at least one local physical adapter passes the connectivity test, the computer may assign the highest-ranked one of such local physical adapters to the virtual adapter. In this manner, the present invention provides methods and apparatus for assigning a local physical adapter to a virtual adapter of a computer. The local physical adapter may be assigned to the virtual adapted quickly and/or such that the distribution of virtual adapters corresponding to physical adapters is balanced.

Figure 1:
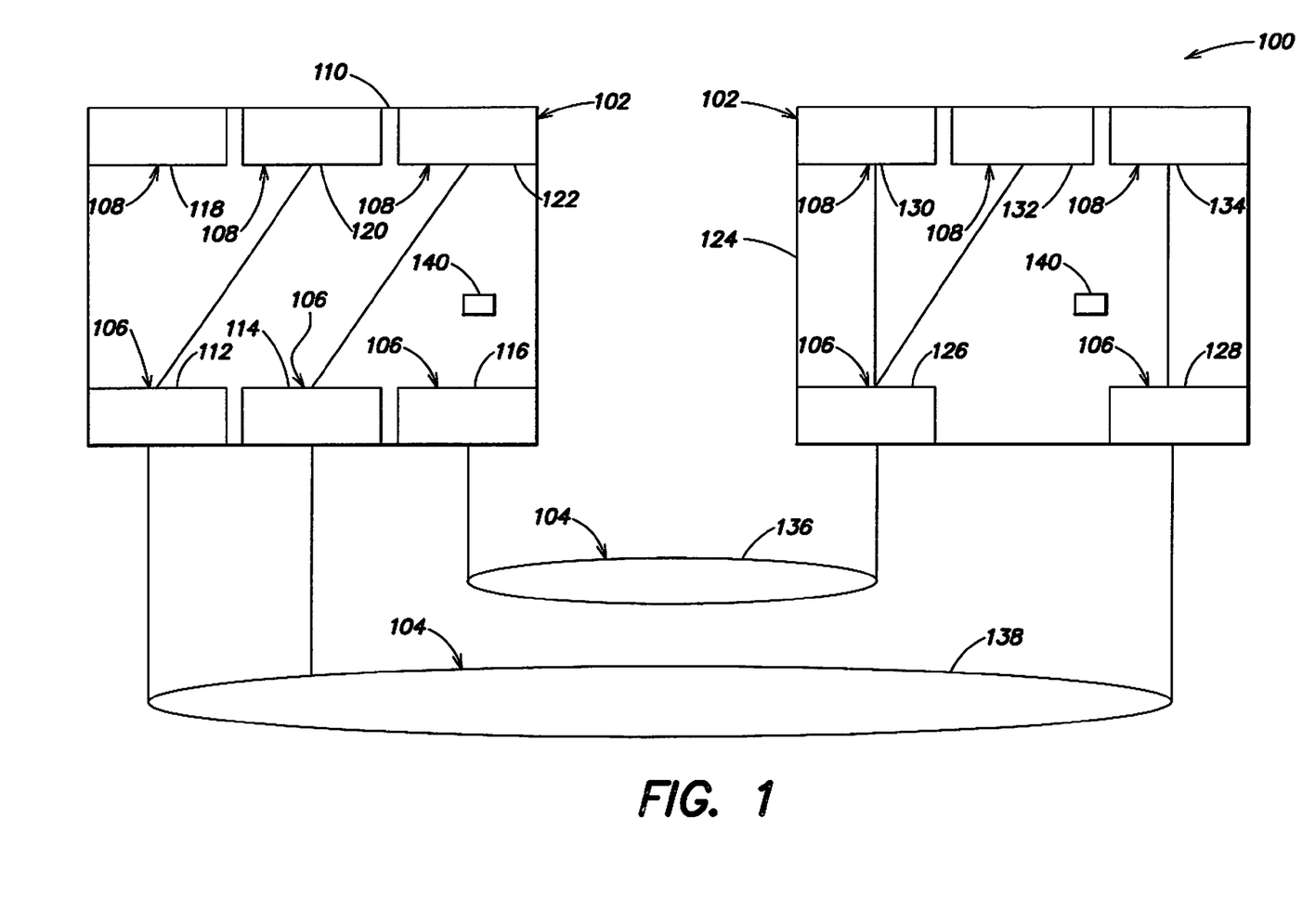
FIG. 1 is a block diagram of a system including a computer adapted to assign a physical adapter to a virtual adapter in the computer in accordance with an embodiment of the present invention.

FIG. 1 is a block diagram of a system 100 including a computer adapted to assign a physical adapter to a virtual adapter in the computer in accordance with an embodiment of the present invention. With reference to FIG. 1, the system 100 may include a plurality of computers 102 coupled together via one or more networks 104. Each computer 102 may include one or more physical network adapters (e.g., interfaces) 106 through which the computer 102 may transmit and/or receive data. Further, one or more of the computers 102 may include at least one virtual network adapter 108. As stated, a virtual network adapter 108 may be a network adapter that uses a physical network adapter 106 to transmit and receive its data. More specifically, the virtual network adapter 108 may be software executed by the computer 102 which enables the computer 102 to receive and/or transmit data using the virtual network adapter 108. However, because the virtual network adapter 108 may be a simulated adapter, the virtual network adapter 108 of the computer 102 may be assigned a physical network adapter 106 through which data to be transmitted from the virtual network adapter 108 may actually be transmitted from the computer 102 and through which data destined for the virtual network adapter 108 may actually be received in the computer 102. One or more virtual network adapters 108 may be included in a system that employs a virtual private network (VPN) and/or operating system (OS) virtualization technology. A VPN may provide a tunnel into a secure network of the system. A virtual network adapter may serve as an adapter to the VPN. OS virtualization technology may be employed by a first OS to simulate a second OS. A virtual network adapter may be employed by the second OS as an adapter through which data may be transmitted and received. Taking this concept even further, if the second OS simulates a third OS, resulting in a hierarchy of virtual network adapters, then the physical network adapter selection concepts in this invention may be used to select a virtual network adapter used to carry traffic for a virtual network adapter in the next higher level of the virtualization hierarchy. However, virtual network adapters may be employed by the computer 102 for other applications. The physical adapter selection concepts in this invention can also be used in applications or programs that do not involve virtual network adapters, but do require physical network adapters to be selected.

For example, the system 100 may include a first computer 110 including first through third physical network adapters 112, 114, 116 and first through third virtual network adapters 118, 120, 122. Further, the system 100 may include a second computer 124 including first and second physical network adapters 126, 128 and first through third virtual network adapters 130, 132, 134. The first and second computers 110, 124 may be coupled via first and second networks 136, 138. For example, the first network 136 may couple the third physical network adapter 116 of the first computer 110 to the first physical network adapter 126 of the second computer 124. Similarly, the second network 138 may couple the second physical network adapter 114 of the first computer 110 to second physical network adapter 128 of the second computer 124. The first physical network adapter 112 of the first computer 110 may be assigned to the first virtual network adapter 118 of the first computer 110 such that the first virtual network adapter 118 may transmit and receive data through the first physical network adapter 112. The third physical network adapter 116 of the first computer 110 may be assigned to the second virtual network adapter 120 of the first computer 110 such that the second virtual network adapter 120 may transmit and receive data through the third physical network adapter 116. Similarly, the first physical network adapter 126 of the second computer 124 may be assigned to the first and second virtual network adapters 130, 132 of the second computer 124 such that both the first and second virtual network adapters 130, 132 of the second computer 124 may transmit and receive data through the first physical network adapter 126. The above system 100 is exemplary, and therefore, the system 100 may be configured differently. For example, one or more virtual network adapters 118, 120, 122 in the first computer 110 may be assigned a different physical network adapter 112, 114, 116 therein, and one or more virtual network adapters 130, 132, 134 in the second computer 124 may be assigned a different physical network adapter 126, 128 therein.

Given the above system configuration, a computer 102 may want to employ a virtual network adapter 108 to communicate via a network 104 with a remote physical network adapter 106 (e.g., a physical network adapter 106 in another computer 102). Therefore, a local physical network adapter 106 (e.g., a physical network adapter 106 in the same computer 102 as the virtual network adapter 108) may be assigned thereto. For example, the third virtual adapter 122 of the first computer 110 may want to communicate via the network 104 to the first physical adapter 126 of the second computer 124. Therefore, the third virtual adapter 122 should be assigned one of the first, second or third physical network adapters 112, 114, 116 through which to receive and/or transmit the data. Using existing methods to assign a physical adapter to a virtual adapter may be problematic. Such methods may consume a large amount of time to assign a physical adapter to a virtual adapter. Additionally or alternatively, such methods do not consider operational conditions and/or configuration of one or more computers 102 included in the system 100. Consequently, such methods may assign a physical adapter to a virtual adapter that causes a distribution of virtual network adapters over the plurality of physical network adapters to be unbalanced. As described below, the present methods and apparatus may avoid such problems by assigning ranks (e.g., by executing software 140 included in a computer 102) to the plurality of physical network adapters 106 included in a computer 102 and employing such ranks to assign a physical adapter 106 to a virtual network adapter 108 that wants to communicate with a remote physical adapter 106 via a network 104.

More specifically, assume the third virtual network adapter 122 of the first computer 110 wants to communicate with the first physical network adapter 126 of the second computer 124. The remote physical network adapter (e.g., first physical network adapter 126) may be known. For example, the virtual network adapter 122 may be provided with knowledge of communication end points during system configuration. In this manner, the third virtual network adapter 122 may know it wants to communicate with the first physical network adapter 126 of the second computer 124 and it may communicate with such remote physical adapter through one of the plurality of local physical network adapters (e.g., one of the first through third physical network adapters 112, 114, 116). The first computer 110 may be adapted to assign a suitable (e.g., the most suitable) physical network adapter 106 through which the third virtual network adapter 122 may communicate with the remote physical adapter 126. More specifically, for the third virtual network adapter 122, the first computer 110 may assign a rank to each physical network adapter 112, 114, 116 included therein. Similarly, the first computer 110 may assign a rank to each physical network adapter 112, 114, 116 included therein for each remaining virtual network adapter 118, 120. As described below, one of the plurality of physical network adapters 112, 114, 116 included in the first computer 110 may be assigned to the third virtual network adapter 122 based on the ranks.

Figure 3:
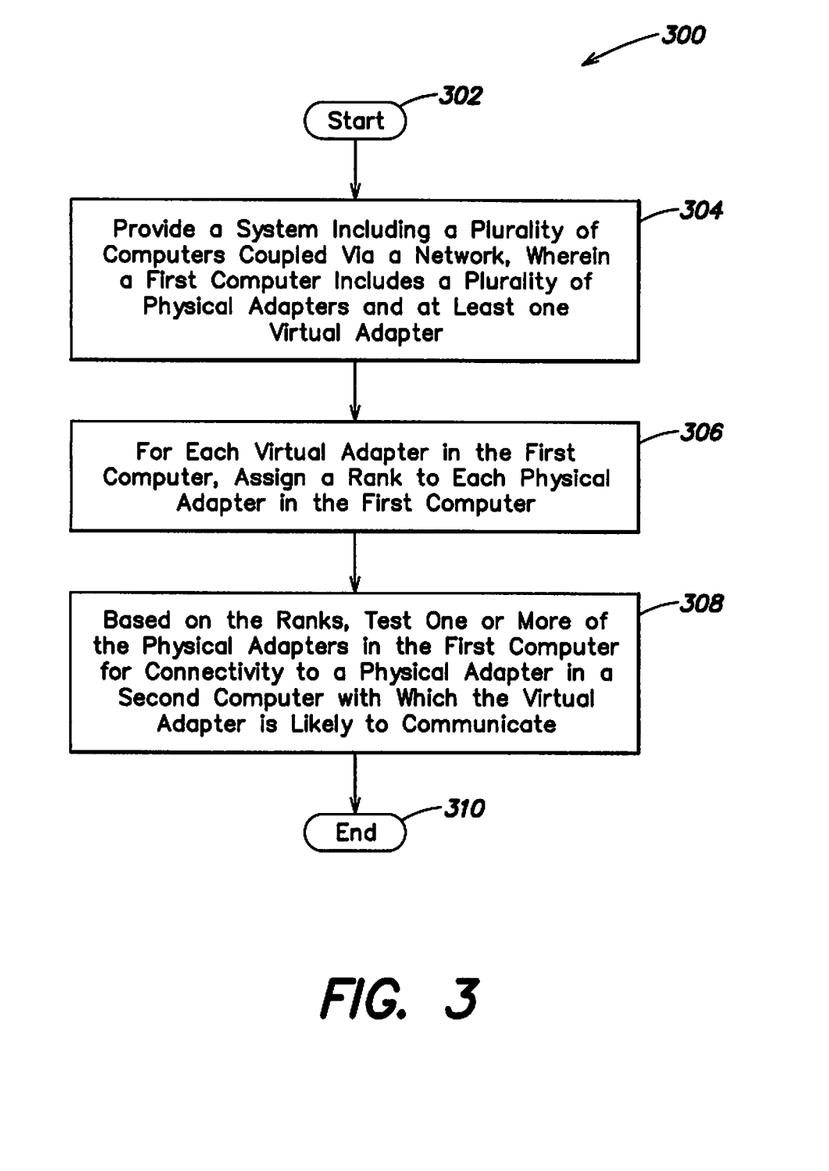
FIG. 3 illustrates a first exemplary method of assigning a physical adapter to a virtual adapter in the computer in accordance with an embodiment of the present invention.
Figure 4:
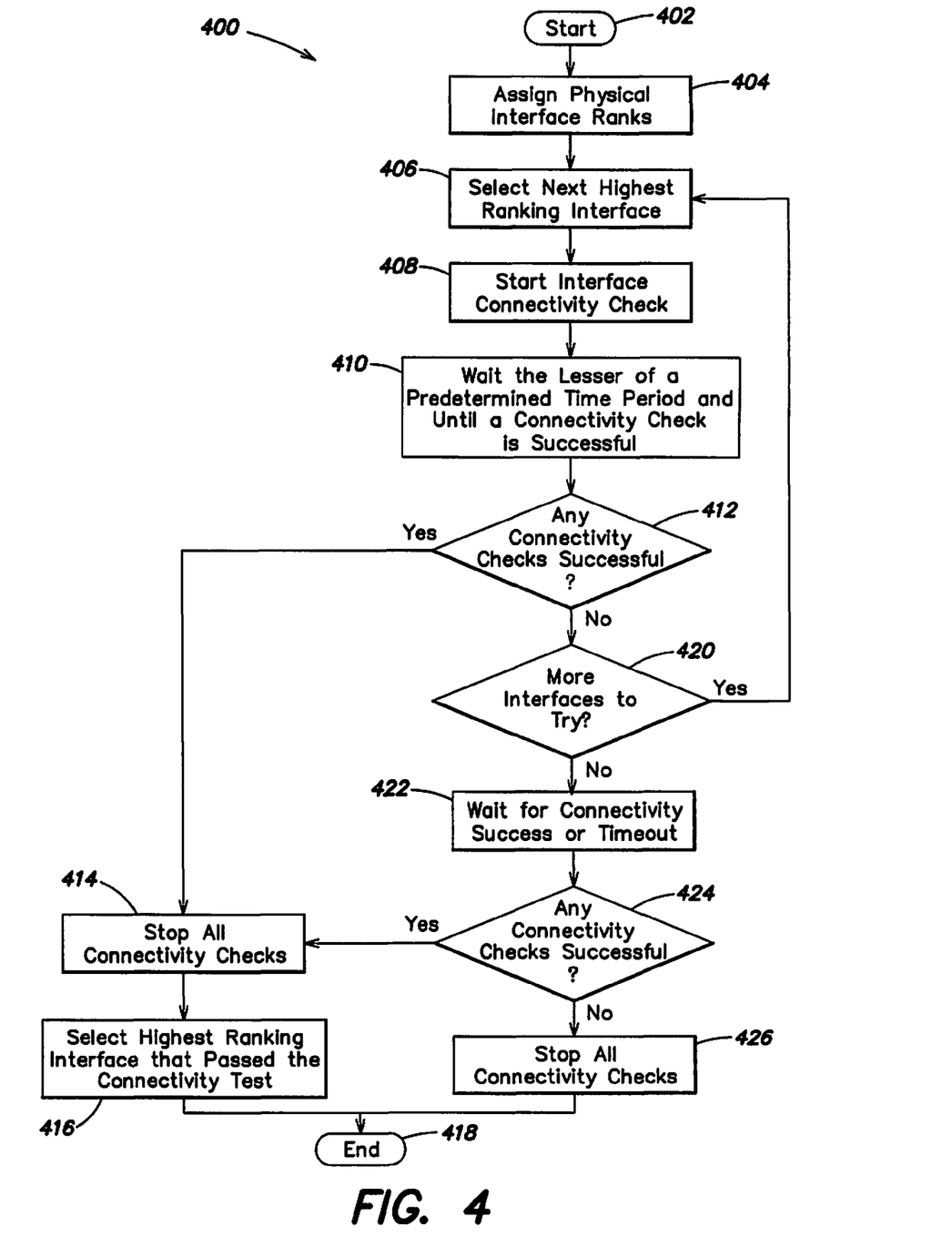
FIG. 4 illustrates a second exemplary method of assigning a physical adapter to a virtual adapter in the computer in accordance with an embodiment of the present invention.

For example, the system 100 may include two computers 110, 124, each of which includes a set of a virtual network adapters 118-122, 130-134 and physical network adapters 112-116, 126-128. As described above, the physical network adapters 112, 114, 116, 126, 128 of the two computers 110, 124 may not be fully connected. More specifically, each physical network adapter 112, 114, 116 of the first computer 110 may not be coupled to each physical network adapter 126, 128 of the second computer 124. Furthermore, the virtual network adapters 108 initially may not have knowledge of the physical network topology (e.g., what network device is coupled to what network device). In order for a virtual network adapter 108 to go "online", the virtual network adapter 108 may need a remote physical network adapter 106 with which to communicate, and a local physical adapter 126, 128 through which to send/receive data (e.g., frames or packets) to the remote physical network adapter 106. A virtual network adapter 108 that is going "online" may know the targeted remote physical network adapter 126, 128. However, the virtual network adapter 108 may not know which local physical network adapter 112, 114, 116 should be employed to send/receive data to the remote physical network adapter 126, 128. Selecting an appropriate local physical network adapter 112, 114, 116 may be difficult, because as described above, the virtual network adapter 108 may not be aware of topologies of the networks 136, 138 in the system 100. Selecting an appropriate local physical network adapter 112, 114, 116 may be important because some physical network adapters 112, 114, 116 may be a better choice than others. For example, if a computer 110, 124 includes many virtual network adapters 118, 120, 122, 130, 132, 134 exist, incorrectly selecting a physical network adapter 112, 114, 116 may cause an unbalanced distribution of the virtual network adapters 118, 120, 122 over the different physical network adapters 112, 114, 116, 126, 128 of the computer 110, 124. FIGS. 3 and 4 illustrate first and second exemplary methods of assigning a physical adapter 106 to a virtual adapter 108 in a computer 110, 124, respectively, in accordance with an embodiment of the present invention.

Figure 2:
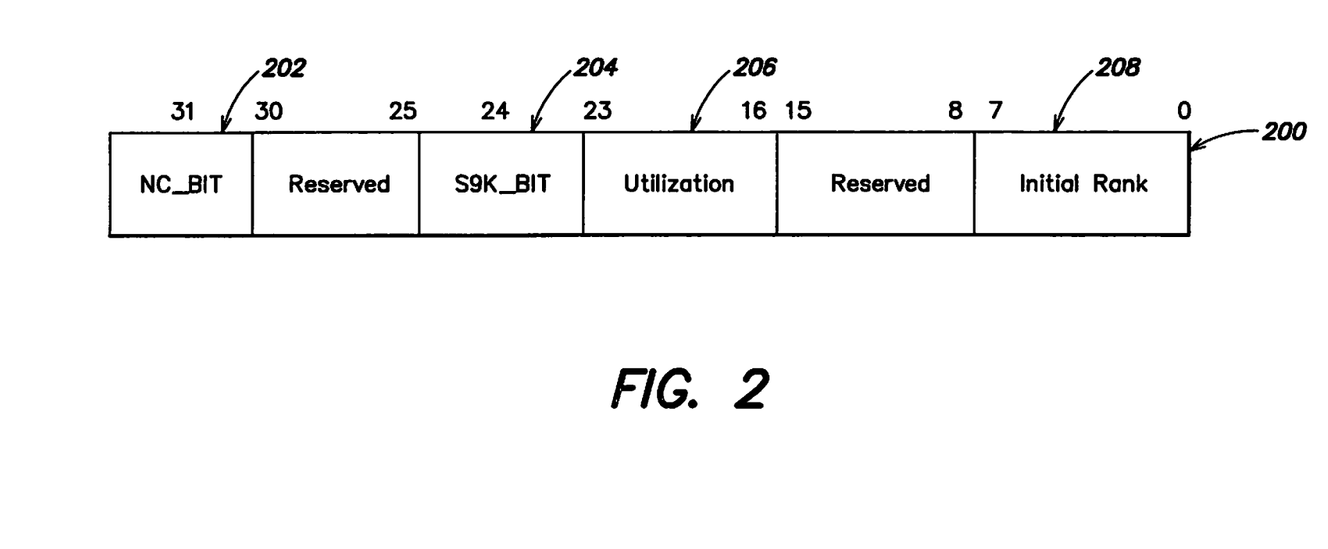
FIG. 2 illustrates a structure of a rank that may be assigned to a physical adapter in accordance with an embodiment of the present invention.

FIG. 2 illustrates a structure of a rank 200 that may be assigned to a physical adapter in accordance with an embodiment of the present invention. With reference to FIG. 2, the rank 200 that may be assigned to a physical network adapter 106 may be a signed thirty-two bit number including one or more fields (although an unsigned number may be employed). For example, the rank 200 may include a bit NC_BIT 202 indicating whether the physical network adapter 106 given such rank 200 is eligible to be assigned to a virtual adapter 108. For example, when asserted, the NC_BIT 202 may indicate that the physical network adapter 106 given the rank 200 may not be a candidate to be assigned to the virtual network adapter 108 during the physical interface selection process. Alternatively, when deasserted, the NC_BIT 202 may not rule out the physical network adapter 106 given the rank 200 during the selection process, and therefore, such physical network adapter 106 may be assigned to the virtual network adapter 108. The NC_BIT 202 may be the most significant bit (MSB) of the rank 200 (e.g., bit 31), and therefore, may indicate the sign of the rank 200. Consequently, a rank 200 given to a physical network adapter 106 including an NC_BIT 202 that indicates the physical network adapter 106 is not eligible (e.g., is not a candidate) to be assigned to a virtual network adapter 108 may be a negative number.

The next six MSBs of the rank 200 (e.g., bits 30-25) may be reserved. The next MSB of the rank 200 may be an S9K_BIT 204 (e.g., bit 24) that indicates a virtual network adapter 108 in the system 100 may handle data packets or frames of a predetermined size and that the physical network adapter 106 given the rank 200 may transmit and receive data packets or frames at least of the predetermined size. For example, when asserted, the S9K_BIT 204 may indicate the virtual adapter 106 may be compatible with (e.g., able to transmit and receive) special data frames or packets, 9 kB in size, and the physical network interface 106 given the rank 200 may be compatible with a frame size that is at least as big as that with which the virtual network adapter 108 is compatible.

The next eight MSBs of the rank 200 (e.g., bits 23-16) may serve as utilization bits 206 which indicate a burden currently on the physical network interface 106 given the rank 200. The value of the utilization bits 206 may be based on the total number of virtual network adapters 108 that have been assigned to the physical network interface 106 given the rank 200. In some embodiments, the greater the value of the utilization bits 206, the less utilized the physical network adapter 106 (e.g., the smaller the number of virtual network adapters 108 that have already been to the physical network adapter 106 given the rank 200). However, in other embodiments, the greater the value of the utilization bits 206, the more utilized the physical network adapter 106 is.

The next eight MSBs of the rank 200 (e.g., bits 15-8) may be reserved. The next eight MSBs of the rank (e.g., bits 7-0) may indicate an initial rank 208 assigned by the virtual network adapter 108 to the physical network adapter 106 given the rank 200. The larger the initial rank 208 included in the rank 200 given to a physical network adapter 106, the more favored the physical network adapter 106 is by the virtual network adapter 108. More specifically, each virtual network adapter 118, 120, 122 of the first computer 110 may assign initial ranks to the physical network adapters 112, 114, 116 of the first computer 110, respectively. For example, the first virtual network adapter 118 may assign a first set of ranks to the plurality of physical network adapters 112, 114, 116, the second virtual network adapter 120 may assign a second set of ranks to the plurality of physical network adapters 112, 114, 116, and the third virtual network adapter 122 may assign a third set of ranks to the plurality of physical network adapters 112, 114, 116. Each set of initial ranks may be unique. For example, the first virtual network adapter 118 may assign initial ranks 1, 2 and 3 to the first through third physical network adapters 112, 114, 116, the second virtual network adapter 120 may assign initial ranks 2, 3 and 1 to the first through third physical network adapters 112, 114, 116, and the third virtual network adapter 122 may assign initial ranks 3, 1, 2 to the first through third physical network adapters 112, 114, 116.

Thus, when a plurality of virtual network adapters 108 are looking for a physical network adapter 106, if remaining fields of the respective ranks 200 given to a physical network adapter 106 by the virtual network adapters 118, 120, 122 are the same, one of the virtual network adapters 118, 120, 122 may favor such physical network adapter 106 more than remaining virtual network adapters 118, 120, 122. To wit, each virtual network adapter 118, 120, 122 may favor the different physical network adapters 112, 114, 116 in a different order. Thus, when virtual network adapters 118, 120, 122 test different physical network adapters 112, 114, 116 based on respective ranks 200 assigned thereto (described below), the virtual network adapters may test the plurality of physical adapters 112, 114, 116, respectively, in a different order.

Thus, each rank 200 may include factors of varying importance, with factors of high importance being located in the higher order bit positions of the rank 200. In this manner, such factors may have a bigger impact on the rank 200. The rank 200 described is exemplary, and therefore, the rank specification may be changed to suit different applications. For example, the rank 200 include a larger or smaller number of and/or different bits. Each rank 200 may include one or more security bits indicating whether the physical network adapter 106 given the rank 200 by the first virtual network adapter 118, 120, 122 is allowed to access the remote physical network adapter 126, 128. As a further example, the NC_BIT 202, S9K_BIT 204, utilization bits 206 and/or initial rank bits 208 may include a larger or smaller number of bits. Further, the order of the bits may be different. By changing the order of the bits, bits occupying positions closer to the MSB of the rank 200 may play a larger role in determining the rank 200 than bits occupying bit positions further from the MSB position.

As described below the rank 200 given to each of the plurality of physical network adapters 112, 114, 116 by a virtual network adapter 118, 120, 122 may be employed by methods of the present invention to assign a physical network adapter 112, 114, 116 to the virtual network adapter 118, 120, 122 through which the virtual network adapter 118, 120, 122 may receive and/or transmit data. FIG. 3 illustrates a first exemplary method 300 of assigning a physical adapter to a virtual adapter in the computer in accordance with an embodiment of the present invention. With reference to FIG. 3, in step 302, the method 300 begins. In step 304, a system including a plurality of computers coupled via a network, wherein a first computer of the plurality of computers includes a plurality of physical adapters and at least one virtual adapter may be provided. For example, the system 100 described above with reference to FIG. 1 may be provided.

In step 306, for each virtual adapter 118, 120, 122 in the first computer 110, a rank 200 may be assigned to each physical adapter 112, 114, 116 in the first computer 110. For example, the first computer 110 may execute software 140 adapted to create (e.g., build) one or more portions of the respective ranks 200 for the plurality of physical network adapters 112, 114, 116 for each virtual network adapter 118, 120, 122. The first computer 110 (e.g., the software 140 executed thereby) may employ one or more queries to build each rank 200. Although ranks 200 may be created for and assigned to the plurality of physical network adapters 112, 114, 116 for each virtual network adapter 118, 120, 122 included in the first computer 110, for convenience the following example focuses on the first virtual adapter 118.

For the first virtual network adapter 118, to assign ranks 200 to the plurality of physical network adapters 112, 114, 116, respective ranks 200 for all physical network adapters 112, 114, 116 may be initialized such that all bits included therein are logic "0"s (although the initialized bits may be logic "1"s). Thereafter, the first computer 110 may employ one or more (e.g., a series) of tests or filters to populate portions or fields of the respective ranks 200 for the physical network adapters 112, 114, 116. The first computer 110 may employ one or more queries to perform each test or filter. For example, the first computer 110 employs one or more tests or filters to identify one or more physical network adapters 112, 114, 116 that cannot be used by the virtual network adapter 118 (e.g., are disqualified). The NC_BIT 202 may be asserted for each disqualified physical network adapter 112, 114, 116. Thus, a first test or filter (e.g., a valid interface filter) may be employed to disqualify physical network adapters 112, 114, 116 which are invalid. Invalid physical network adapters 112, 114, 116 may be specified during system configuration. For example, a user may specify one or more physical network adapters 112, 114, 116 that may not be assigned to the virtual network adapter 118. The NC_BIT 202 may be asserted in the rank 200 given to such physical network adapters 112, 114, 116 by the first virtual network adapter 118 so that those physical network adapters 112, 114, 116 are disqualified. A second test or filter (e.g., a frame size filter) may be employed to disqualify physical network adapters 112, 114, 116 which are invalid. The frame size filter may be employed to disqualify any physical network adapters 112, 114, 116 with a maximum frame size that may be too small to be used by the virtual network adapter 118 (e.g., any physical network adapters 112, 114, 116 that may not accommodate packets or frames as large as the packets or frames accommodated by the virtual network adapter 118). For example, assume the first virtual network adapter 118 is adapted to use jumbo packets or frames (e.g., a 9 kB packet or frame), the first computer 110 may employ the frame size filter to disqualify any physical network adapters 112, 114, 116 that are adapted to only accommodate packets or frames of a standard size (e.g., 1.5 kB). Network adapters that support jumbo frames are considered desirable because they provide a higher throughput. Further, the S9K_BIT 204 may be set in the ranks 200 for the plurality of physical network adapters 112, 114, 116 while employing the frame size filter (e.g., based on the querying) to see if any physical network adapters 112, 114, 116 are disqualified.

Although two tests or filters are described above to see if any of the physical network adapters 112, 114, 116 are not eligible to be assigned (e.g., are disqualified) to the first virtual network adapter 118, the physical network adapters 112, 114, 116 may pass through a larger or smaller number of and/or different tests or filters to suit different applications. For example, the first computer 110, 124 may employ a filter to perform a security check to see if a physical network adapter 112, 114, 116 is allowed to connect to the remote physical network adapter 126, 128.

Additionally or alternatively, the first computer may perform utilization processing on the plurality of physical adapters 112, 114, 116. For example, for each physical network adapter 112, 114, 116, the first computer 110 may employ a plurality of queries to determine the number of virtual network adapters 118, 120, 122 to which the physical network adapter 112, 114, 116 is currently assigned. The utilization bits 206 may be set based on such queries. For example, the value of the utilization bits 206 may be based on the following formula: maximum number of virtual adapters allowed in first computer minus the number of virtual network adapters that employ the physical network adapter to communicate. In this manner, utilization bits 206 for a physical network adapter 106 with less virtual network adapters 108 using it may be higher than other physical network adapters 106.

Additionally or alternatively, to form the ranks 200 for the plurality of physical network adapters 112, 114, 116, the first computer 110 may perform initial ranking processing. For example, the first computer 110 may employ the first set of initial ranks 208 assigned by the first virtual network adapter 118 to the plurality of physical network adapters 112, 114, 116 as a portion or field of the respective ranks 200. Similarly, the first computer 110 may employ the second set of initial ranks 208 assigned by the second virtual network adapter 120 to the plurality of the physical network adapters 112, 114, 116 as a portion or field of the respective ranks 200, and so on. As described above, each set of initial ranks 208 assigned to the physical network adapters 112, 114, 116 by the virtual network adapters 118, 120, 122, respectively, may be unique. To wit, the initial ranks 208 that are given to the different physical network adapters 112, 114, 116, respectively, will be different depending on which virtual network adapter 118, 120, 122 the initial ranks 208 are associated with. Further, the initial rank 208 assigned to each physical network adapter 112, 114, 116 may occupy the least significant bit positions (LSBs) of the rank 200. Therefore, when the higher order bits included in respective ranks 200 given to the physical network adapters 112, 114, 116 by two different virtual network adapters 118, 120, 122 are the same, each virtual network adapter 118, 120, 122 will naturally try using the different physical network adapters 112, 114, 116 in a different order. In this manner, for each virtual network adapter 118, 120, 122, a rank 200 may be assigned to each of the plurality of physical network adapters 112, 114, 116.

In step 308, based on the ranks 200, one or more of the physical adapters 112, 114, 116 in the first computer 110 may be tested for connectivity to a physical adapter 126, 128 in a second computer 124 with which the virtual adapter 118, 120, 122 would like (e.g., is likely) to communicate. The first computer 102 may employ TCP connect, ping or similar tool to test connectivity of one or more physical network adapter 112, 114, 116 in the first computer 110 to the remote physical network adapter 126 targeted by the first virtual adapter 118.

For example, the first computer 110 may test the physical network adapter 112, 114, 116 given the highest rank 200 by the first virtual network adapter 118 for connectivity to the first physical network adapter 126 of the second computer 124. After a predetermined time period or interval (e.g., 125 ms), the first computer 110 may test the physical network adapter 112, 114, 116 given the next highest rank 200 by the first virtual network adapter 118 for connectivity to the first physical network adapter 126 of the second computer 124. The first computer 110 may test remaining physical network adapters 112, 114, 116 of the first computer 110 in a similar manner. Although a time period of 125 ms is described above, a larger or smaller time period may be employed. For example, the predetermined time period may vary based to suit different application. In this manner, respective connectivity tests for a first and second physical network adapter 112, 114, 116 in the plurality of physical network adapters 112, 114, 116 may be offset in time. Further, two or more of such connectivity tests may overlap. Such a staggered connectivity checking scheme is illustrated and described below with reference to FIG. 5. In this manner, connectivity to the first remote physical network adapter 126 may be verified for one or more of the plurality of physical network adapters 112, 114, 116 included in the first computer 110 quickly while allowing some time for a highly-ranked physical network adapter 112, 114, 116 some time to verify connectivity before testing lower ranked physical network adapters 112, 114, 116. To perform the above-described overlapping connectivity tests or checks, the first computer 110 may create separate threads for each connectivity check. After creating a first thread, the first computer may create a subsequent thread such that the first and second threads are staggered. To wit, the first computer 110 may create a first thread, wait a small amount of time and then create another thread.

The first computer 110 may assign a physical network adapter 112, 114, 116 to the first virtual network adapter 118 based on the results of the connectivity tests of the plurality of physical network adapters 112, 114, 116. As described above, the connectivity testing of the plurality of physical network adapters 112, 114, 116 may be based (in part) on respective ranks 200 assigned thereto. Further, each rank 200 may be based on local properties (e.g., operational conditions and/or configuration) of the first computer 110. For example, each rank 200 may be based on whether the physical network adapter 106 given such rank 200 is eligible to be assigned to a virtual network adapter 108, whether the physical network adapter 106 given the rank 200 may transmit and receive data packets or frames at least of the predetermined size, utilization of the physical network adapter 106, initial rank of the physical network adapter 106 and/or any other suitable factor. Therefore, the present method 300 may quickly assign a suitable (e.g., the most suitable) physical network adapter 112, 114, 116 to the first virtual network adapter 118.

Thereafter, step 310 may be performed. In step 310, the method 300 ends. Through use of the present method 300, the first computer 110 may quickly select and assign a physical network adapter 112, 114, 116 to a virtual network adapter 118, 120, 122. The present method 300 may ensure that a local physical network adapter 112, 114, 116 assigned to the first virtual network adapter 118 is connected to the remote physical network adapter 126, 128 targeted by the first virtual network adapter 118. Additionally or alternatively, the first computer 110 may employ local properties, such as maximum frame sizes accommodated by the local physical network adapters 112, 114, 116 and/or physical network adapter 112, 114, 116 utilization, respectively, to make intelligent decisions as to which physical network adapters 112, 114, 116 are more suitable for the first virtual network adapter 118 than remaining physical network adapters 112, 114, 116. In this manner, the method 300 may result in a balanced distribution the different physical network adapters 112, 114, 116 to the virtual network adapters 118, 120, 122. Thus, the most suitable physical network interface 112, 114, 116 for a virtual network adapter 118 may be heuristically selected based on local properties and interaction with the network 104. Although creation and assigning of ranks to physical network adapters 112, 114, 116 of the first computer 110 is described above, remaining computers (e.g., the second computer 124) in the system 100 may create and assign ranks to physical network adapters 126, 128 included therein in a similar manner. In this manner, even though virtual network adapters 108 of a computer 110, 124 may not know respective topologies of networks 136, 138 in the system 100, the present methods and apparatus may heuristically determine and assign the most suitable physical network adapter 106 to a virtual network adapter 108 through which the virtual network adapter 108 may transmit and/or receive data. To wit, the present invention may provide an approach to assigning or relating one or more virtual network adapters 108, which may not know system network topology, to physical network adapters 106 using overlapped connectivity tests (e.g., connection attempts) staged to favor physical network adapters 106 with most favorable local properties.

FIG. 4 illustrates a second exemplary method 400 of assigning a physical adapter to a virtual adapter in the computer in accordance with an embodiment of the present invention. With reference to FIG. 4, in step 402, the method 400 begins. Steps 402-426 may be divided into two stages. The first stage may include steps 402 and 404 which relate to assigning ranks 200 to physical network interfaces 106 included in the system 100. The second stage may include steps 406-426 which relate to intelligent use of the ranks 200 to interact with the network 104 to determine connectivity of a local physical network interface 112, 114, 116, which may be assigned to a virtual network interface 108, to a remote physical network interface 126, 128. In step 404, ranks may be assigned to the physical interfaces 106. For example, for each virtual network interface 118, 120, 122 in the first computer 110, the first computer 110 may create and assign ranks 200 to the plurality of physical network adapters 112, 114, 116. Step 404 of the method 400 may be similar to step 306 of the method 300, and therefore, is not described in detail herein.

In step 406, a next highest ranking physical network interface may be selected. For example, to select a physical network interface 112, 114, 116 of the first computer 110 through which a first virtual network interface 118 may receive and transmit data, the first computer 110 may select the highest ranking physical network interface 112, 114, 116 from the plurality of physical network interfaces 112, 114, 116 that are still candidates for assignment to the first virtual network interface 118. When the first computer 110 selects a physical network interface 112, 114, 116, the first computer 110 may set the NC_BIT 202 in the rank 200 given the selected physical network interface 112, 114, 116 such that the physical network interface 112, 114, 116 will not be selected again (e.g., will be disqualified) during subsequent connectivity checking.

In step 408, an interface connectivity check may start on the selected physical network interface 112, 114, 116. For example, the first computer 110 may employ TCP connect, ping, or similar connectivity tool to test the selected physical network interface 112, 114, 116 for connectivity to the remote physical network interface 126, 128 targeted by the first virtual network interface 118.

In step 410, the first computer 110 may wait the lesser of a predetermined time period and until a connectivity check is successful. For example, the first computer 110 may wait for the predetermined time period (e.g., 125 ms) to allow any outstanding connectivity checks to complete. If the first computer 110 waits the predetermined time period without receiving indication that a connectivity test is successful, then step 412 may be performed. Alternatively, if the first computer 110 receives indication that a connectivity check for a selected physical network interface 112, 114, 116 is successful before the predetermined time period expires, step 412 may be performed immediately. The predetermined time period may be small (e.g., small compared to the longest time that it might take for a connectivity check to determine there is no connectivity (e.g., for a connectivity tool to timeout).

In step 412, the first computer determines whether any of the connectivity checks are successful. Further, the first computer 110 may determine how many connectivity checks were successful. If at least one connectivity check for one or more physical network interfaces 112, 114, 116 started in step 408 completes successfully, the first computer 110 may store or record the physical network interface 112, 114, 116 of such interfaces with the highest rank, and thereafter, step 414 may be performed.

In step 414, all connectivity checks may be stopped. For example, because the first computer 110 has already received an indication that at least one connectivity check for a selected physical network interface 112, 114, 116 was successful, the first computer 110 may terminate any pending connectivity checks of other physical network interfaces 112, 114, 116.

Thereafter, step 416 may be performed. In step 416, the highest ranking physical interface 112, 114, 116 that passed the connectivity test may be selected. The first computer 110 may select such physical interface 112, 114, 116 as the interface through which the first virtual network interface 118 may receive and/or transmit data. In this manner, the method 400 may be employed to select a physical network interface 112, 114, 116 through which the first virtual network interface 118 may send and/or receive data.

Thereafter, step 418 may be performed. In step 418, the method 400 ends.

Alternatively, if no connectivity checks for the physical network interfaces 112, 114, 116 started in step 408 have completed successfully, step 420 may be performed. In step 420, the first computer 110 may determine whether there are any remaining physical network interfaces 112, 114, 116 that have not been tested for connectivity to the remote physical network interface 126, 128. The first computer 110 may determine the number of physical network interfaces 112, 114, 116 that are still candidates to be assigned to the first virtual network interface 118 (e.g., by checking for unset NC_BITs 202 in the respective ranks 200 for the physical network interfaces 112, 114, 116). If the first computer 110 determines one or more physical network interfaces 112, 114, 116 have not been tested for connectivity (e.g., there are one or more physical network interfaces 112, 114, 116 left to try), step 406 may be performed. Step 406 is described above, and therefore, will not be described again in detail herein. Alternatively, if, in step 420, the first computer 110 determines no more physical network interfaces 112, 114, 116 remain (e.g., that all physical network interfaces 112, 114, 116 have been tested for connectivity so there are no more physical network interfaces 112, 114, 116 left to try), step 422 may be performed.

In step 422, the system 100 (e.g., first computer 110 included therein) may wait for an indication that at least one connectivity check is successful or for all connectivity checks to complete. The first computer 110 may wait up to a predetermined time period (e.g., a maximum timeout limit) for all connectivity checks to complete. If the first computer 110 receives an indication that a connectivity test is successful, step 424 may be performed immediately. Alternatively, the first computer 110 may wait until all connectivity checks complete without success (or until the maximum timeout limit is reached). Thereafter, step 424 may be performed.

In step 424, the first computer 110 may determine whether any of the connectivity checks are successful. Further, the first computer 110 may determine how many connectivity checks were successful. If at least one connectivity check for one or more physical network interfaces 112, 114, 116 started in step 408 completes successfully, the first computer 110 may store or record the physical network interface 112, 114, 116 of such interfaces with the highest rank, and thereafter, step 414 may be performed. Step 414 is described above, and therefore, is not described again in detail herein. Alternatively, if, in step 424, the first computer 110 determines all connectivity checks complete without success (or the maximum timeout limit is reached), step 426 may be performed. In step 426, all connectivity checks may be stopped. For example, the first computer 110 may stop any connectivity checks that were pending when the maximum timeout limit was reached. Thus, the method 400 does not select a physical network interface 112, 114, 116 to be assigned to the first virtual network interface. Therefore, the method may result in an error.

Thereafter, step 418 may be performed, in which the method 400 ends. Through use of the second exemplary method 400, the system 100 may intelligently interact with the network 104 and determine the best suitable physical network interface 112, 114, 116 for the first virtual network adapter 118 through which the virtual network adapter 118, 120, 122 may receive and/or transmit data. Further, the second exemplary method 400 may provide at least the same advantages as the first exemplary method 300.

Figure 5:
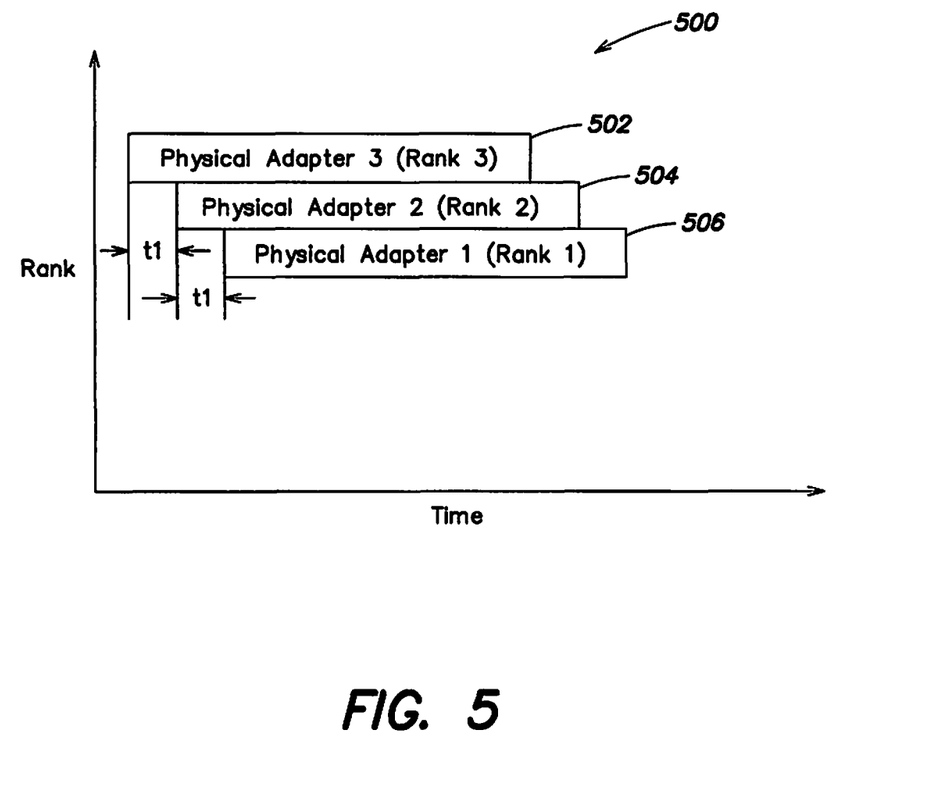
FIG. 5 illustrates a plurality of connectivity tests that overlap and are delayed in time relative to each other employed by the first and second exemplary methods in accordance with an embodiment of the present invention.

FIG. 5 illustrates a plurality of connectivity tests 500 that overlap and are delayed in time relative to each other employed by the first and second exemplary methods 300, 400 in accordance with an embodiment of the present invention. Assume the first virtual adapter 118 assigns rank 1 to the first physical network adapter 112, rank 2 to the second physical network adapter 114 and rank 3 to the third physical network adapter 116, where rank 3 is the highest rank and rank 1 is the lowest rank. With reference to FIG. 5, to determine which of the plurality of physical network adapters 112, 114, 116 to assign to the first virtual network adapter 118, the system 100 (e.g., first computer 110 included therein) may start a first test 502 of the highest ranking physical network adapter 106 (e.g., the third physical network adapter 116) for connectivity to a remote physical network adapter 126 targeted by the first virtual network adapter 118. After a predetermined time period (e.g., t1), the first computer 110 may start a second test 504 of the next highest ranking physical network adapter 106 (e.g., the second physical network adapter 114) for connectivity to the remote physical network adapter 126 targeted by the first virtual network adapter 118. Further, after a predetermined time period (e.g., t1), the first computer 110 may start a third test 506 of the next highest ranking physical network adapter 106 (e.g., the first physical network adapter 112) for connectivity to the remote physical network adapter 126 targeted by the first virtual network adapter 118. As shown, the first and second connectivity tests 502, 504 do not complete before the third connectivity test starts 506. Therefore, the first through third connectivity tests 502, 504, 506 may overlap in time. Further, by waiting the predetermined time period t1 before starting the second and third tests 504, 506, the first through third connectivity tests 502, 504, 506 may be offset or staggered in time. Thus, such tests may be employed to quickly identify which physical network adapter 112, 114, 116 may be assigned to the first virtual network adapter 118 while still allowing a highly-ranked (e.g., desired) physical network interface 112, 114, 116 time to verify connectivity before lower ranked physical network interfaces 112, 114, 116.

The foregoing description discloses only exemplary embodiments of the invention. Modifications of the above disclosed apparatus and methods which fall within the scope of the invention will be readily apparent to those of ordinary skill in the art. For instance, in some embodiments, the rank 200 may include one or more bits indicating a protocol that the physical network adapter 112, 114, 116, 126, 128 may accommodate.

Accordingly, while the present invention has been disclosed in connection with exemplary embodiments thereof, it should be understood that other embodiments may fall within the spirit and scope of the invention, as defined by the following claims.

The invention claimed is:

1. A method of assigning a physical adapter local to a computer to a virtual adapter in the computer through which the virtual adapter may receive and transmit data, comprising:
    providing a system including a plurality of computers coupled via a network, wherein a first computer of the plurality of computers includes a plurality of physical adapters and at least one virtual adapter;
    for each virtual adapter in the first computer, assigning a rank to each physical adapter in the first computer; and
    based on the ranks, testing one or more of the physical adapters in the first computer for connectivity to a physical adapter in a second computer with which a first virtual adapter is likely to communicate.

2. The method of claim 1 wherein testing one or more of the physical adapters in the first computer for connectivity to the physical adapter in the second computer with which the first virtual adapter is likely to communicate based on the ranks includes:
    testing a first physical adapter in the first computer for connectivity to the physical adapter in the second computer based on the ranks; and
    testing a second physical adapter in the first computer for connectivity to the physical adapter in the second computer based on the ranks, wherein testing of the second physical adapter is delayed in time from and overlaps with the testing of the first physical adapter.

3. The method of claim 1 further comprising assigning one of the plurality of first physical adapters in the first computer to the first virtual adapter based on the testing.

4. The method of claim 3 wherein assigning one of the plurality of physical adapters in the first computer to the first virtual adapter based on the testing includes, after at least one physical adapter in the first computer passes the connectivity test, assigning to the first virtual adapter the physical adapter having the highest rank from the physical adapters in the first computer that pass the connectivity test.

5. The method of claim 1 wherein the rank assigned to a physical adapter in the first computer indicates that the physical adapter is not available to be assigned to the first virtual adapter.

6. The method of claim 1 wherein the rank assigned to a physical adapter in the first computer is based on at least one of operational conditions of and a configuration of the first computer.

7. The method of claim 1 wherein assigning a rank to each physical adapter in the first computer for each virtual adapter in the first computer includes:
 for the first virtual adapter, assigning a first set of ranks to the plurality of physical adapters; and
 for a second virtual adapter, assigning a second set of ranks to the plurality of physical adapters, wherein the second set of ranks is different than the first set of ranks.

8. An apparatus for assigning a physical adapter local to a computer to a virtual adapter in the computer through which the virtual adapter may receive and transmit data, comprising:
 a first computer adapted to couple to a second computer via a network and including:
  a plurality of physical adapters; and
  at least one virtual adapter;
 wherein the first computer is adapted to:
  for each virtual adapter in the first computer, assign a rank to each physical adapter in the first computer; and
  based on the ranks, test one or more of the physical adapters in the first computer for connectivity to a physical adapter in the second computer with which the first virtual adapter is likely to communicate.

9. The apparatus of claim 8 wherein the first computer is further adapted to:
 test a first physical adapter in the first computer for connectivity to the physical adapter in the second computer based on the ranks; and
 test a second physical adapter in the first computer for connectivity to the physical adapter in the second computer based on the ranks;
 wherein testing of the second physical adapter is delayed in time from and overlaps with the testing of the first physical adapter.

10. The apparatus of claim 8 wherein the first computer is further adapted to assign one of the plurality of physical adapters in the first computer to the first virtual adapter based on the testing.

11. The apparatus of claim 10 wherein the first computer is further adapted to, after at least one physical adapter in the first computer passes the connectivity test, assign to the first virtual adapter the physical adapter having the highest rank from the physical adapters in the first computer that pass the connectivity test.

12. The apparatus of claim 8 wherein the rank assigned to a physical adapter in the first computer indicates that the physical adapter is not available to be assigned to the first virtual adapter.

13. The apparatus of claim 8 wherein the rank assigned to a physical adapter in the first computer is based on at least one of operational conditions of and a configuration of the first computer.

14. The apparatus of claim 8 wherein the first computer is further adapted to:
 for the first virtual adapter, assign a first set of ranks to the plurality of physical adapters; and
 for a second virtual adapter, assign a second set of ranks to the plurality of physical adapters, wherein the second set of ranks is different than the first set of ranks.

15. A system for assigning a physical adapter local to a computer to a virtual adapter in the computer through which the virtual adapter may receive and transmit data, comprising:
 a first computer including:
  a plurality of physical adapters; and
  at least one virtual adapter;
 a second computer including a physical adapter with which a virtual adapter of the first computer is likely to communicate; and
 a network coupling the first and second computers;
 wherein the first computer is adapted to:
  for each virtual adapter in the first computer, assign a rank to each physical adapter in the first computer; and
  based on the ranks, test one or more of the physical adapters in the first computer for connectivity to the physical adapter in the second computer with which the first virtual adapter is likely to communicate.

16. The system of claim 15 wherein the first computer is further adapted to:
 test a first physical adapter in the first computer for connectivity to the physical adapter in the second computer based on the ranks; and
 test a second physical adapter in the first computer for connectivity to the physical adapter in the second computer based on the ranks;
 wherein testing of the second physical adapter is delayed in time from and overlaps with the testing of the first physical adapter.

17. The system of claim 15 wherein the first computer is further adapted to assign one of the plurality of physical adapters in the first computer to the first virtual adapter based on the testing.

18. The system of claim 17 wherein the first computer is further adapted to, after at least one physical adapter in the first computer passes the connectivity test, assign the physical adapter having the highest rank to the first virtual adapter from the physical adapters in the first computer that pass the connectivity test.

19. The system of claim 15 wherein the rank assigned to a physical adapter in the first computer indicates that the physical adapter is not available to be assigned to the first virtual adapter.

20. The system of claim 15 wherein the rank assigned to a physical adapter in the first computer is based on at least one of operational conditions of and a configuration of the first computer.

21. The system of claim 15 wherein the first computer is further adapted to:
 for the first virtual adapter, assign a first set of ranks to the plurality of physical adapters; and
 for a second virtual adapter, assign a second set of ranks to the plurality of physical adapters, wherein the second set of ranks is different than the first set of ranks.

* * * * *